No. 756,055. PATENTED MAR. 29, 1904.
L. B. RHODES.
PROTRACTOR RULE.
APPLICATION FILED APR. 6, 1903.
NO MODEL.

Witnesses:
Geo. B. Rowley
E. E. Potter

Inventor:
L. B. Rhodes,
By H. Everth
Attorneys.

No. 756,055.

Patented March 29, 1904.

UNITED STATES PATENT OFFICE.

LOUIS B. RHODES, OF BLAIRSVILLE, PENNSYLVANIA.

PROTRACTOR-RULE.

SPECIFICATION forming part of Letters Patent No. 756,055, dated March 29, 1904.

Application filed April 6, 1903. Serial No. 151,392. (No model.)

*To all whom it may concern:*

Be it known that I, LOUIS B. RHODES, a citizen of the United States of America, residing at Blairsville, in the county of Indiana and State of Pennsylvania, have invented certain new and useful Improvements in Protractor-Rules, of which the following is a specification, reference being had therein to the accompanying drawings.

This invention relates to certain new and useful improvements in protractor-rules, and relates more particularly to that class of protractors which is adapted to give the angle of a sine, cosine, tangent, or cotangent of the given circle or any angle of the circle the radius of which is a given unit, whereby the results of different lengths of radii may be computed from the same.

The object of this invention is to provide a protractor which may be folded up in a compact form when not in use and which may also be used for the measurement of lengths as the ordinary rule.

With the above and other objects in view the invention consists in the novel combination and arrangement of parts to be hereinafter more fully described, and pointed out in the claims.

In describing the invention in detail reference is had to the accompanying drawings, forming a part of this specification, and wherein like characters of reference indicate like parts throughout the several views, in which—

Figure 1:
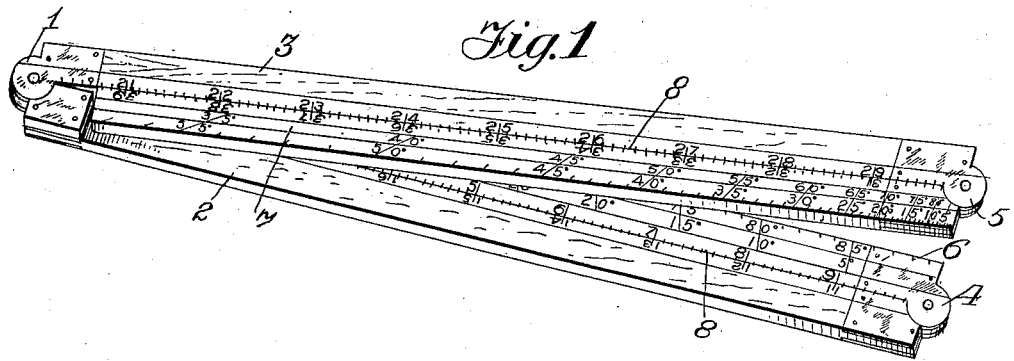
Figure 2:
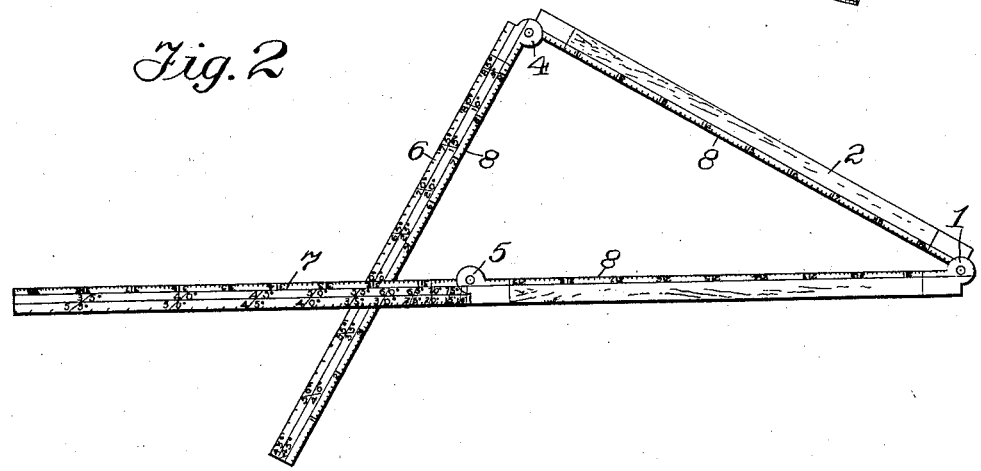
Figure 3:
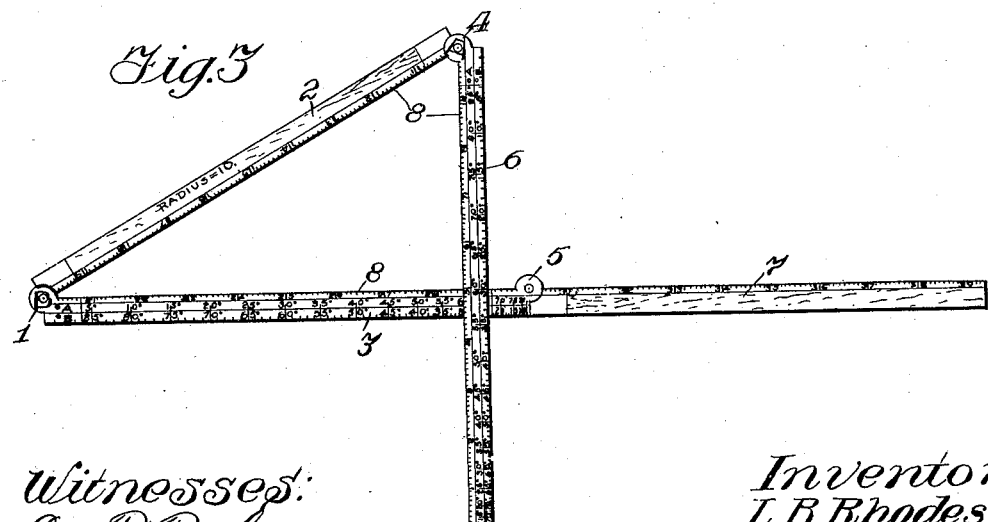

Figure 1 is a perspective view of my improved protractor in its folded position, the same being partly open. Fig. 2 is a view of the same in the position for determining the angle of a given tangent or cotangent. Fig. 3 is a view showing the opposite face of the protractor in the position for determining the angle of a given sine or cosine.

The rule as constructed is preferably made in four parts, each part having a given number of linear divisions—say ten—which are suitably subdivided. As shown in the drawings, these divisions each represent one inch, but could be metrically graduated. Midway the length of the rule is an offset hinge connection 1, which is marked in the same manner as the sections of the rule to which it is attached, to which the parts 2 and 3 are secured, and joints 4 5 pivotally connect these parts 2 and 3 with the parts 6 and 7, respectively, the joint 4 being marked in the same manner as the sections of the rule to which it is attached. The rule as graduated has on its inner edge the linear graduations 8, these graduations being placed on both sides of the protractor. On one side, as shown in Fig. 3, between the linear graduations and the rear edge of the rule the parts 3 and 6 are suitably graduated in degrees, one line of which on either section is marked A and the other line of which is marked B. The part 2 represents the given radius of a circle as indicated in the drawings, the same being ten units or inches.

By arranging the rule as shown in Fig. 3, the part 2 being the given radius, the part 6 from the joint 4 to its juncture with the part 3 will be the sine of the angle formed by part 2 and part 3, and the cosine of the same angle will be that portion of part 3 which extends from joint 1 to the junction with part 6. As the parts 3 and 6 are graduated on their inner edges in inches and fractions of an inch, the proportional length of the sine and cosine of the angle will be readable directly from the graduations. Therefore as the rule is shown in Fig. 3 the length of the radius is ten inches, the length of the sine five inches, and the length of the cosine eight inches. In the same position of the rule the angle formed by parts 2 and 3 is indicated by the graduations on the line A of part 3 as thirty degrees, and the angle of part 3 with the sine is indicated as sixty degrees.

The parts 6 and 7 of the rule are suitably graduated between the linear graduations and the rear edge of the rule, and after the same has been moved so that the readings just described may have been taken the rule is reversed or turned over and the part 6 moved until the inner edges of parts 6 and 7 perfectly register with the graduations, when the angle of the tangent and cotangent may be determined, which, as shown in Fig. 2 of the drawings, are sixty degrees and thirty degrees. The length of these different sines and tangents may be determined by the direct reading of linear graduations on the rule, the same always being as given for a radius of ten and the relation of any radius to ten determining the relation of the reading to the actual length of the sine or tangent.

It will be noted that when the device is positioned as shown and described in connection with Fig. 2 the parts 6 2 will form an angle of ninety degrees, thereby forming a square which may be used as such.

It will be noted that various slight changes may be made in the details of construction without departing from the general spirit of my invention.

Having fully described my invention, what I claim as new, and desire to secure by Letters Patent, is—

1. In an instrument of the character described, the combination of a plurality of pivotally-mounted sections, linear graduations thereon and double lines of graduations indicating angles, the device being adapted to be set by means of said graduations to indicate by direct reading the angle and the proportional length of the sine, cosine, tangent and cotangent of said angle for a given radius.

2. In an instrument of the character described the combination of a plurality of pivotally-mounted sections having on both sides thereof linear graduations and double lines of graduations, the device being adapted to be set by means of said graduations to indicate by direct reading of one side the angle and proportional length of the sine and cosine and by direct reading of the other side the angle and proportional length of the tangent and cotangent of said angle for a given radius.

In testimony whereof I affix my signature in the presence of two witnesses.

LOUIS B. RHODES.

Witnesses:
J. T. HENRY,
R. H. WIGGINS.